(12) United States Patent
Coutarel et al.

(10) Patent No.: US 7,766,051 B2
(45) Date of Patent: Aug. 3, 2010

(54) STABILIZED FLEXIBLE PIPE FOR TRANSPORTING HYDROCARBONS

(75) Inventors: Alain Coutarel, Mont-Saint-Aignan (FR); Fabrice Bectarte, Rouen (FR)

(73) Assignee: Technip France (FR)

( * ) Notice: Subject to any disclaimer, the term of this patent is extended or adjusted under 35 U.S.C. 154(b) by 576 days.

(21) Appl. No.: 11/577,066

(22) PCT Filed: Oct. 12, 2005

(86) PCT No.: PCT/FR2005/002526

§ 371 (c)(1),
(2), (4) Date: Apr. 11, 2007

(87) PCT Pub. No.: WO2006/042939

PCT Pub. Date: Apr. 27, 2006

(65) Prior Publication Data

US 2009/0050228 A1 Feb. 26, 2009

(30) Foreign Application Priority Data

Oct. 21, 2004 (FR) .................................. 04 11210

(51) Int. Cl.
*F16L 11/16* (2006.01)
(52) U.S. Cl. .................. 138/135; 138/134; 138/133; 138/138; 138/129
(58) Field of Classification Search ................ 138/134, 138/135, 137, 140, 127
See application file for complete search history.

(56) References Cited

U.S. PATENT DOCUMENTS

| | | | | |
|---|---|---|---|---|
| 5,213,637 A | 5/1993 | Mallen Herrero et al. ... | 148/598 |
| 5,275,209 A * | 1/1994 | Sugier et al. ................. | 138/135 |
| 5,934,334 A * | 8/1999 | Gray, Jr. et al. ............. | 138/112 |
| 6,843,278 B2 * | 1/2005 | Espinasse .................... | 138/134 |
| 6,926,039 B2 * | 8/2005 | Marion ........................ | 138/134 |
| 7,318,454 B2 * | 1/2008 | Dupoiron ..................... | 138/135 |
| 7,445,030 B2 * | 11/2008 | Hardy et al. ................. | 138/135 |
| 2003/0102044 A1 * | 6/2003 | Coutarel et al. ............. | 138/130 |
| 2004/0261878 A1 * | 12/2004 | Jung et al. ................... | 138/135 |
| 2005/0097720 A1 * | 5/2005 | Coutarel et al. ............... | 29/450 |
| 2006/0130924 A1 * | 6/2006 | Dupoiron ..................... | 138/135 |

FOREIGN PATENT DOCUMENTS

GB 1 239 884 7/1971
WO WO 03/083343 A1 10/2003

OTHER PUBLICATIONS

International Search Report PCT/FR2005/002526 dated Mar. 3, 2006.

* cited by examiner

*Primary Examiner*—Patrick F Brinson
(74) *Attorney, Agent, or Firm*—Ostrolenk Faber LLP

(57) ABSTRACT

The invention relates to a flexible pipe for transporting hydrocarbons, comprising the following, from the inside towards the outside: a cylindrical structural set adapted in such a way that it can withstand radial stress and at least one first armure lap, said first armure lap comprising a plurality of armure threads wherein the armure threads consist of formed and flattened metal threads, the width of said armure I being greater than the thickness e when they are wound in parallel in the form of a spiral with a longitudinal pitch around the structure set, said threads forming an angle of less than 60° angle with the generators (G) of said structural set, and the width/thickness ratio of the armure threads is greater than 4.

7 Claims, 2 Drawing Sheets

STABILIZED FLEXIBLE PIPE FOR TRANSPORTING HYDROCARBONS

CROSS REFERENCE TO RELATED APPLICATION

The present application is a 35 U.S.C. §§371 national phase conversion of PCT/FR2005/002526, filed Oct. 12, 2005, which claims priority of French Application No. 0411210, filed Oct. 21, 2004. The PCT International Application was published in the French language.

BACKGROUND OF THE INVENTION

The present invention relates to a stabilized flexible pipe for transporting hydrocarbons. More particularly, the invention relates to the armor wires of the flexible pipe that make it possible in particular to limit the lateral buckling of the tensile armor plies of the flexible pipe.

Flexible pipes as defined in American Petroleum Institute Recommendation API 17J generally comprise one or more polymeric layers and metal reinforcing layers such as tensile armor plies, a carcass and/or a pressure vault. The nature, number, dimensions and organization of these layers are essentially tied to the conditions of use of the flexible pipes in question and to their installation, as is defined in the API 17J. Recommendation.

When a flexible pipe, whatever its nature, is subjected to an external pressure $P_e$ higher than the internal pressure, an axial compression, known as the inverse end effect, is produced. The inverse end effect has a tendency to produce a longitudinal compressive force in the armors and to shorten the length of the flexible pipe. In addition, the flexible pipe is also subjected to dynamic stresses, especially during installation or in service in the case of risers. All of these stresses may result in damage of one or more armor plies and thus eventually degrade the flexible pipe. An armor ply is considered to be damaged when certain wires are broken and/or have undergone substantial permanent (plastic) deformation and/or are overlapped.

A first cause of damage of the armors is an excessive stress state resulting from excessively large forces and/or deformations resulting in the rupture and/or plastic deformation of the wires. This mode of degradation may occur in the event of an inverse end effect, but also in other situations.

A second cause of damage is buckling, that is to say an instability phenomenon that may result in large displacements (and deformations) of the armors. This mode of degradation can exist only if there is a longitudinal compressive force in the armor wires, that is to say in particular in the inverse end effect situation. The instability occurs as soon as the axial compression exceeds a level called the critical load. This depends on the nature of the armor wire (modulus of the material, width, thickness) and on the state of all the armors (imposed deformation such as transverse deflections, rubbing on the other layers, resistance of the other layers, etc.). In general, when the critical load is reached, the armor will in fact be considered to be sound in view of other criteria such as, for example, stresses below the yield strength of the material.

Admittedly, buckling instability is one potential cause of damage, but in certain cases there may be buckling without damage to the armors. This occurs (even though the wire is intrinsically unstable) when the amplitude of its deformations is sufficiently limited so that a state of degradation is reached (for example by the yield strength being exceeded). Such a limitation in the deformations may be envisaged for example by bearing on the neighboring wires (limited lateral instability thanks to very small lateral clearances) or else by bearing on another layer (as in the case of radial instability). In the contrary case, since the displacements are not sufficiently limited, the lateral buckling may lead to overlapping and/or plastic deformation of the armor wires, but this is in fact only a consequence of the buckling instability.

A third cause of damage is the disorganization of the armors by overlapping of the wires. Depending on the type of flexible pipe and the dynamic stresses undergone, there are situations in which the lateral clearances between wires are taken up at least over part of the length of a laying pitch. There is therefore a threshold for the amplitude of the lateral contact forces beyond which wire overlap may occur. This threshold depends on several factors, including the geometry of the wires (thickness of the wire, concavity of the edges), the magnitude of the frictional forces, the relatively large freedom of radial movement.

To summarize, under the inverse end effect and when the pipe is subjected to dynamic stresses such as bending stresses, the armor plies of the pipe may be damaged according to the following damage modes: excessive stresses (yield strength exceeded), buckling instability and/or disorganization by overlapping. Once damage has been initiated in one of these modes for at least one wire, the equilibrium of the structure may be disturbed to the point that the other wires perish in a cascade effect, according to the same damage mode or else according to other modes.

When a flexible pipe bends, the wires of the armor plies move with respect to the subjacent core. The amplitude of these longitudinal and transverse displacements depends on many parameters, such as the bend radius, the characteristics of the armor plies (lay angle, clearance between wires, nature of the wires), the state of the external sheath (impermeable or otherwise), the applied forces (tensile and compressive forces, internal pressure, external pressure, friction forces within the structure). The displacements of these wires generally lead to clearances between wires of a given ply that have a variable amplitude along a laying pitch. In addition, the armor displacements are accompanied by wire deformations, the amplitude of which depends on the magnitude of the frictional forces.

Under certain conditions, for example with a nonimpermeable external sheath and whether the pipe is straight or bent, the armor wires may buckle in a radial mode and adopt the shape of a "bird cage".

Another mode of damage of the tensile armors, which is due to the compressive stress that they undergo with the inverse end effect is what is called "lateral buckling", which may occur when the flexible pipe is bent and irrespective of the state of the external sheath. The term "lateral buckling" will refer to all of the modes of lateral damage of the armor wires described above, namely excessive stresses (yield strength exceeded), lateral buckling instability and/or disorganization by overlapping.

When the external sheath is impermeable, the effects of the external pressure are liable to generate large frictional forces between the various plies of the structure. These frictional forces combined with the dynamic stresses are liable to result in migration of the wires, that is to say localized increase in the displacements, transverse deformations and lateral clearances between the wires of any one armor ply. These phenomena are thus liable to cause lateral buckling of the armor wires especially by progressive plastic deformation of their edges.

When the polymeric external sheath of the flexible pipe is nonimpermeable, whether this is intentional or else because it has been damaged for any reason, the pressure obtaining in the annulus where the tensile armors are placed is equal to the hydrostatic pressure. The migration of the armor wires under the effect of the dynamic stresses and of less friction, may result in lateral buckling or also a radial buckling phenomenon.

One of the solutions adopted, and described in patent WO 03/083343 for reducing the risks of "bird cage" radial buckling and/or lateral buckling, and also for reducing the swelling of the armors due to the inverse end effect, especially when the external sheath is nonimpermeable, is to wind tapes or reinforced layers, for example of aramid fibers, such as KEVLAR fibers, around the last armor ply and the subjacent plies. In this way, the swelling of each of the armor plies is, on the one hand, controlled while reducing, on the other hand, the risk of damage by overlapping of the armor plies. However, although this solution does solve the problems associated with radial buckling, it makes it possible only to limit the risk of lateral buckling, which persists.

In the prior art, one of the solutions used to combat lateral damage is the use of thicker armors. This solution increases the resistance of the wires to buckling instability while not penalizing them in respect of lateral damage by excessive stress due to their migration. It is also possible to reduce the risks by increasing the lay angle. Another envisaged solution consists in increasing the number of armor plies. However, all of these solutions are generally penalizing, as they are heavy, expensive and not very effective.

When an armor wire moves laterally as a result of lateral buckling, it may under certain conditions carry with it the other armor wires of the ply. The result is that the flexible pipe is if not destroyed at least rendered unusable and it has to be changed since repair of the flexible pipe is not conceivable economically speaking.

SUMMARY OF THE INVENTION

One problem that arises and that the present invention is intended to solve is therefore how to provide a flexible pipe whose armors are not damaged especially under the inverse end effect and that also can be produced at an advantageous cost, in particular for large-diameter pipes.

For this purpose, the present invention proposes a flexible pipe for transporting hydrocarbons, comprising, from the inside outward, a cylindrical structural assembly designed to withstand the radial forces and at least a first armor ply, said first armor ply comprising a plurality of armor wires, said armor wires consisting of flattened shaped metal wires, said armor wires, which have a width l greater than a thickness e, being wound parallel in a long-pitch helix about said structural assembly, said wires making an angle of less than 60° with the generatrices of said structural assembly; according to the invention said armor wires have a width/thickness ratio l/e equal to or greater than 4.

Thus, one feature of the invention lies in the use of broad armor wires, the width of which is equal to or greater than four times the thickness, in order to produce the armors of the flexible pipes, these broad armor wires being obtained by drawing and rolling, and heat treatments of round wires. Thus, lateral buckling is prevented and the number of wires to be simultaneously wound in a helix in order to form the pipe is reduced, since they cover a larger area. For example, by using wide armor wires according to the invention over a large part of the flexible pipes manufactured, the armor plies comprise fewer than forty wires, which are wound simultaneously so as to produce the pipe, whereas in general a much larger quantity is necessary, requiring the installation of a large number of spools of wire on the machines or armorers.

However, there are substantial preconceptions against the use of wide armor wires. Owing to the friction between the armor plies, the displacement of the wires is not completely free so that the wires may adopt imposed transposed curvatures. This therefore results, for wide armor wires, in higher stresses on the edges than with narrower wires, and these stresses may, under certain conditions, cause the edges of the wires to undergo plastic deformation. This therefore compromises the resistance of the armors to lateral buckling. In addition, the use of wide wires also has other drawbacks and especially the problems of manufacturing broad wire and problems relating to its use in a flexible pipe (preforming of the wires during laying).

However, against all expectations, it turns out that the benefit of increasing the moment of inertia of the wide wires outweighs the drawback of increasing the stresses on the edges in order to combat the lateral buckling phenomena. Thus, despite these preconceptions, the wide armor wires according to the invention, the width of which is equal to or greater than four times the thickness, make it possible not only to produce flexible pipes for an advantageous cost but also to produce flexible pipes whose armor wires are resistant to lateral buckling. In this way, the invention provides a flexible pipe having greater resistance to the combination of external pressure and dynamic stresses, but also makes it possible, for given depth and stress conditions, to propose an optimized design of flexible pipes.

According to another feature, the armor wires have an ultimate tensile strength of greater than 900 MPa. This embodiment is particularly advantageous for flexible pipes intended for large depths, which must consequently be able to withstand large axial compressive forces when they are installed on the seabed, but also to withstand large dynamic stresses both in tension and in bending, especially during installation or in service in the case of risers. The choice of wires having a high ultimate tensile strength makes it possible to improve the resistance of the armor plies to lateral buckling and to dynamic stresses, especially owing to the fact that these wires also have a fortiori, a high yield strength, so that the static and dynamic stresses applied in service to said wires remain considerably below said yield strength. This makes it possible in particular to prevent the edges of the wires from undergoing plastic deformation and to ensure good fatigue resistance in the case of dynamic stresses. Increasing the mechanical properties also makes it possible, for a given load, to reduce the cross section of the wires, and consequently the weight of the flexible pipe. This generally is of great importance in the case of deep-sea applications because of the capacity limitations of the installation or production means. A preconception against the use of wide wires having high mechanical properties is associated with the greater difficulty of cold preforming and winding the wires that are both stronger and of greater cross section. However, despite these preconceptions, it is possible to use these wires to manufacture a flexible pipe.

According to another feature of the invention, the average roughness Ra of the faces located on the edges of said wires, which is measured according to the ISO 4287 Standard, is less than 1.6. Consequently, the edges of the wires have a good surface finish, this having the effect of improving the fatigue behavior of the armor plies. This is because the edges of the wires are regions that are particularly stressed in fatigue, owing to the transverse curvatures imposed on the wires when the flexible part is subjected to curvature variations. In addition, a good surface finish helps to reduce the risk of fatigue crack initiation.

According to another advantageous feature, the armor wires, seen in cross section, have, on their two flanks, bearing faces that are substantially plane and perpendicular to their large faces. In one advantageous embodiment, the height of the bearing faces is greater than 30% of the thickness of the wires.

According to another feature of the invention, the armor wires, seen in cross section, have in their four corners joining fillets of substantially rounded shape with an average radius of greater than 0.5 mm. First of all, the presence of these fillets prevents stress concentration in the corners, the corners being regions that are particularly stressed in fatigue. This improves the fatigue behavior of the armor plies. Next, these fillets prevent these burrs and sharp edges that could damage the adjacent layers, particularly if they are layers made of a polymer material.

According to one embodiment of the invention, the flexible pipe includes a second armor ply, the armor wires of said second armor ply being wound in a reverse long-pitch helix about said first armor ply, and the ratio of the width to the thickness of the armor wires of said second ply is smaller than said width/thickness ratio of the wires of said first ply. Consequently, the resistance to the stresses exerted on the flexible pipe is compensated for in a completely symmetrical manner by the cross winding of the armor wires of the two plies. This makes it possible to use narrower wires on one of the plies, resulting in a potential cost reduction.

BRIEF DESCRIPTION OF THE DRAWINGS

Other features and advantages of the invention will become apparent on reading the description given below of one particular embodiment of the invention, given by way of indication but implying no limitation, with reference to the appended drawings in which.

DESCRIPTION OF A PREFERRED EMBODIMENT

Figure 1:
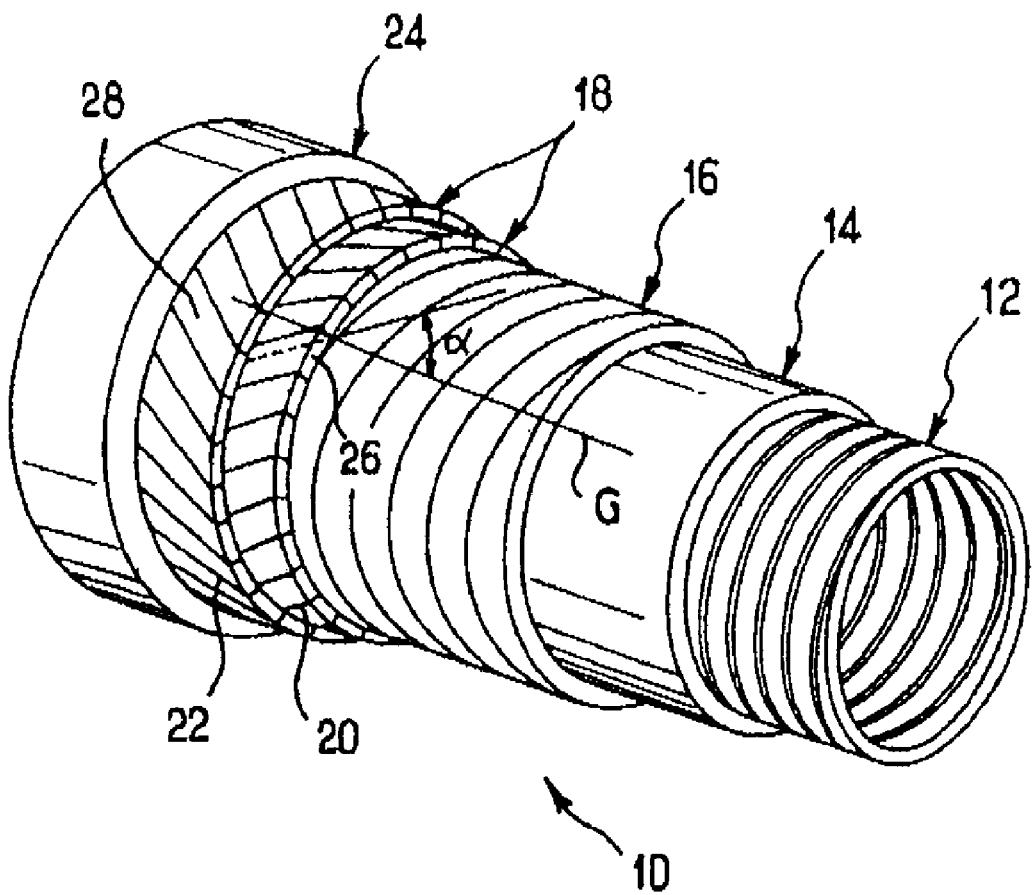
FIG. 1 is a partial schematic view in perspective of a flexible pipe according to the invention.

FIG. 1 illustrates a pipe 10 comprising, from the inside outward, a carcass 12 made of a shaped and interlocked strip, a polymeric internal sealing sheath 14, a metal vault 16 consisting of the short-pitch helical winding of at least one shaped metal wire, here a self-interlocked zeta-shaped wire, an assembly 18 consisting of a pair of crossed armor plies—an internal ply 20 and an external ply 22—wound with a long pitch in opposite directions at less than 60°, and a polymeric external sealing sheet 24.

Thus, although the cross armor plies 20, 22, which will be explained in detail later, allow the pipe 10 to withstand the axial tensile forces in the longitudinal direction of the pipe 10, the cylindrical structural assembly, from the carcass 12 to the metal vault 16, allows the pipe to withstand the radial forces.

Figure 2:
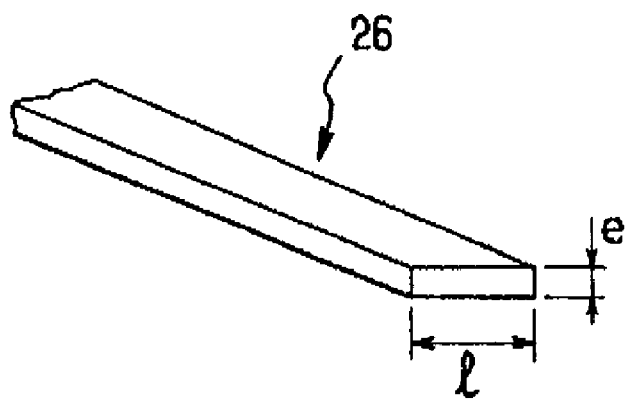
FIG. 2 is a partial schematic view in perspective of a detail of an element shown in FIG. 1.

The internal armor ply 20 consists of a plurality of armor wires 26, wound in a parallel fashion in a long-pitch helix around the metal vault 16. The armor wires 26, here thirty-two in number, make an angle α of less than 60° to the generatrices G of the metal vault 16. One feature of these armor wires 26, a partial illustration of which is shown in perspective in FIG. 2, is the fact that, on the one hand, they are obtained by drawing and rolling wires of round shape and, on the other hand, their width l is at least four times their thickness e, for example 4.25 times.

Thus, starting from drawn and rolled round wires, wide armor wires are obtained in a single pass, for a very advantageous cost, the l/e ratio of the wires being greater than 4. Furthermore, thanks to the drawing operation, it is also possible to obtain wires whose mechanical properties are increased, especially in terms of hardness and strength, unlike a metal strip obtained for example by slitting a sheet. This process, which combines drawing, heat treatment and cold rolling, makes it possible to obtain and use wide armor wires, the ultimate tensile strength of which is greater than 900 MPa, advantageously 1100 MPa or preferably 1400 MPa.

Figure 3:
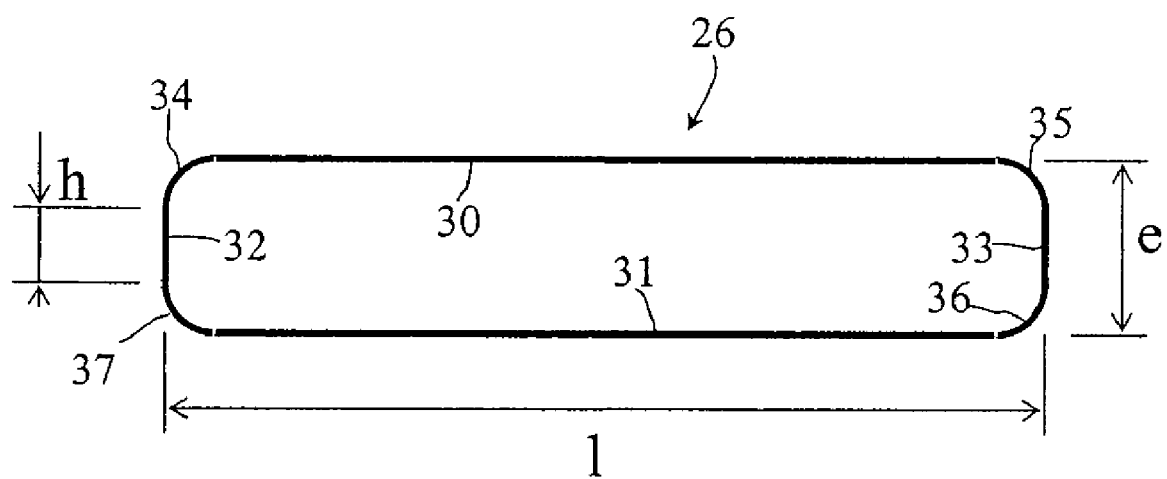
FIG. 3 is a schematic cross-sectional view of a detail of an element shown in FIG. 1.

FIG. 3 shows one particularly advantageous wire geometry. On each side of the large faces 30, 31, the edges of the wire have, symmetrically, substantially plane faces 32, 33 perpendicular to the large faces 30, 31. The presence of these plane faces 32, 33 helps to improve the behavior of the armor ply subjected to a compressive force thereby reducing the risk of the wires, which bear against one another, overlapping. This is because these faces 32, 33 act as bearing surfaces during contact between adjacent wires. Their orientation perpendicular to the lateral forces and displacements generated by the compression allows the wires to bear on one another without the risk of overlapping. In addition, the height h of these faces 32, 33 is preferably greater than 30% of the thickness of the wires, advantageously 40%, so as to improve the bearing between adjacent wires in order to avoid the risk of overlapping. Furthermore, the height h of the faces 32, 33 is advantageously less than 70% of the thickness of the wires, preferably less than 60%, the rest of the thickness being occupied by the fillets 34, 35, 36, 37 with the large faces 30, 31.

These wires are manufactured, in one or more steps, between at least two successive pairs of substantially mutually perpendicular rolling rolls, a first pair for shaping the large faces 30, 31 and a second pair, perpendicular to the first, for shaping the faces 32, 33 of said edges of the wire.

Advantageously, the average roughness Ra of the faces 32, 33, 34, 35, 36, 37 located on the edges of said wires, which is measured according to the ISO 4287 Standard, is less the 1.6. Thus, the edges of the wires have a good surface finish, this having the effect of improving the fatigue behavior of the armor plies.

Advantageously, the large faces 30, 31 themselves also have an average roughness Ra of less than 1.6, thus, the frictional forces between superposed layers are reduced.

According to another embodiment, the wires are fully tested beforehand using a nondestructive eddy current testing device, making it possible to detect surface defects of the crack, pleat or scab type, said testing device being calibrated in order to detect defects of a size unacceptable for the mechanical behavior of the wire.

According to another feature of the invention, the armor wires, seen in cross section have, in their four corners, joining fillets 34, 35, 36, 37 of substantially rounded shape with an average radius of greater than 0.5 mm, advantageously 1 mm.

The external armor ply 22, shown in FIG. 1, comprises a plurality of armor wires 28 also wound parallel to each other in a long-pitch helix about the internal armor ply 20 in the opposite direction, making an angle of less than 60° to the generatrices. The armor wires 28 of the external armor ply 22 are either identical to the armor wires 26 of the internal armor ply 20 or of different dimensions, for example with a smaller l/e ratio.

Furthermore, the armor wires 26, 28 of the two armor plies 20, 22 have, for example, a thickness between 2 and 9 millimeters and a width between 8 and 36 millimeters. To give an illustration, for flexible pipes suitable for deep water, the inside diameter of which is greater than 9 inches, the wires have a cross section measuring 3×20, 5×20 or 5×22 millimeters. In addition, on this type of pipe, given as an example, the use of armors having a width/thickness ratio equal to or greater than 4 advantageously makes it possible to produce a pipe with fewer than 40 wires per armor ply.

Moreover, placed between the armor plies is a layer of the aramid type, for example in the form of Kevlar tapes wound in a helix along the pipe.

The invention claimed is:

1. A flexible pipe for transporting hydrocarbons, comprising, from the inside outward:
   a cylindrical structural assembly capable of withstanding radial forces, said cylindrical structural assembly including a short-pitch helical metal winding and a polymeric internal sealing sheath; and
   at least a first armor ply operative to withstand axial tensile forces, said first armor ply comprising a plurality of armor wires, said armor wires comprising flattened shaped metal wires, which have a width greater than a thickness, said wires being wound parallel in a long-pitch helix about said structural assembly making an angle of less than 60° with generatrices of said structural assembly, and said armor wires have a width/thickness ratio equal to or greater than 4
   wherein said wires have four corners and, as seen in cross section, said wires have four corners with joining fillets of substantially rounded shape with an average radius greater than 0.5 mm.

2. The flexible pipe as claimed in claim 1, wherein said wires have an ultimate tensile strength greater than 900 MPa.

3. The flexible pipe as claimed in claim 1, wherein each said wire has edges and said edges have faces and an average roughness Ra of said faces located on said edges of said wires has a value of less than 1.6.

4. The flexible pipe as claimed in claim 1, wherein said wires have large faces and have two flanks and, as seen in cross section, said two flanks have bearing faces that are substantially planar and perpendicular to said large faces.

5. The flexible pipe as claimed in claim 4, wherein a height h of said bearing faces is less than 60% of a thickness of said wires.

6. The flexible pipe as claimed in claim 1, wherein said armor ply comprises fewer than forty armor wires.

7. Flexible pipe for transporting hydrocarbons, comprising, from the inside outward:
   a cylindrical structural assembly capable of withstanding radial forces, said cylindrical structural assembly including a short-pitch helical metal winding and a polymeric internal sealing sheath;
   at least a first armor ply operative to withstand axial tensile forces, said first armor ply comprising a plurality of armor wires, said armor wires comprising flattened shaped metal wires, which have a width greater than a thickness, said wires being wound parallel in a long-pitch helix about said structural assembly making an angle of less than 60° with generatrices of said structural assembly, and said armor wires have a width/thickness ratio equal to or greater than 4; and
   a second armor ply including second armor wires wound in a reverse long-pitch helix about said first armor ply, and a ratio of width to thickness of said armor wires of said second ply is smaller than said width/thickness ratio of said wires of said first ply.

* * * * *